Figures 1, 2, 3:
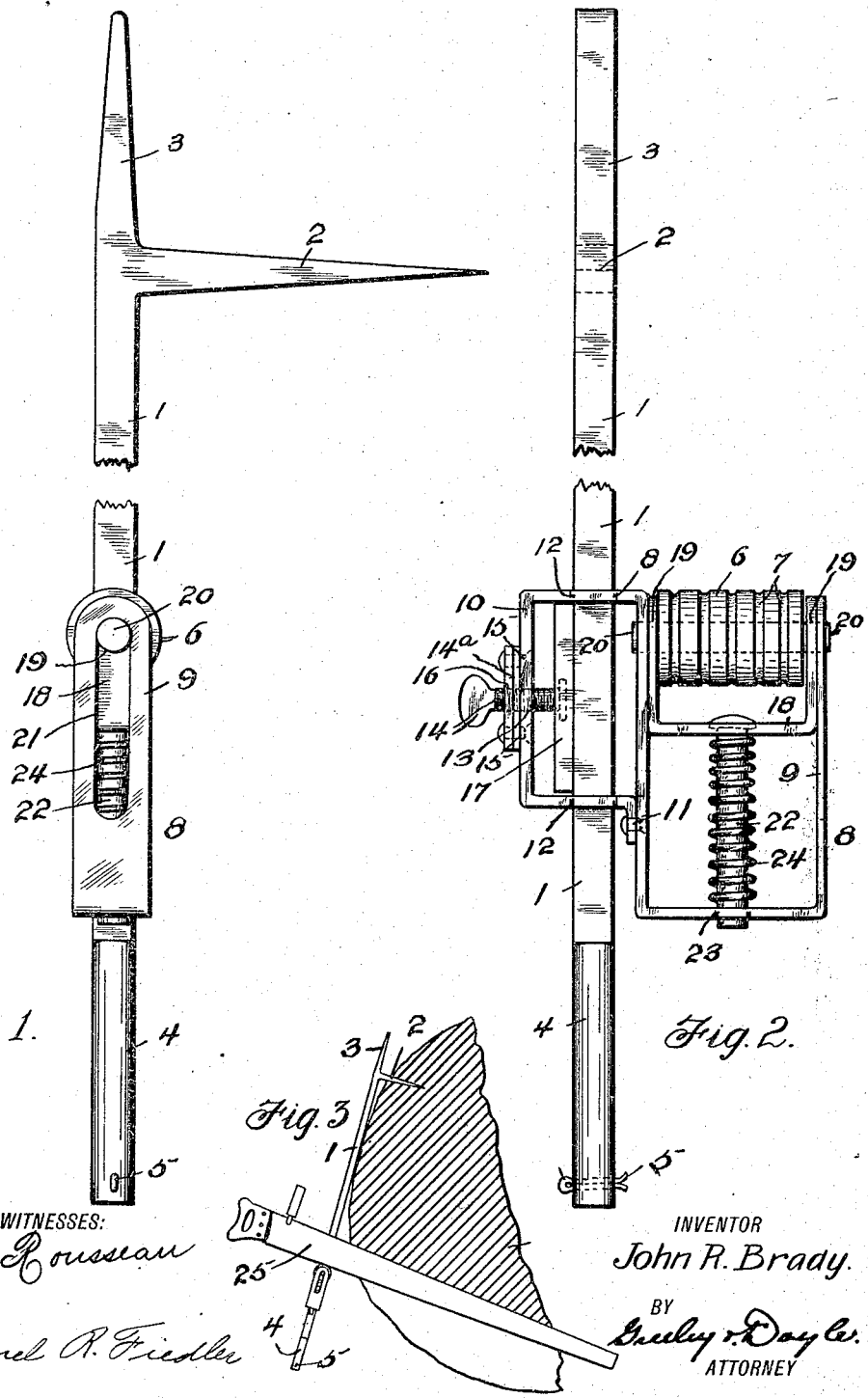

J. R. BRADY.
UNDERCUT SAW GUIDE.
APPLICATION FILED JUNE 3, 1915.

1,200,163.

Patented Oct. 3, 1916.

WITNESSES:
R. E. Rousseau
Lionel R. Fiedler

INVENTOR
John R. Brady.
BY
Greeley & Doyle
ATTORNEY

UNITED STATES PATENT OFFICE.

JOHN R. BRADY, OF PORTLAND, OREGON.

UNDERCUT-SAW GUIDE.

1,200,163.   Specification of Letters Patent.   Patented Oct. 3, 1916.

Application filed June 3, 1915. Serial No. 31,905.

*To all whom it may concern:*

Be it known that I, JOHN R. BRADY, a citizen of the United States, residing at Portland, in the county of Multnomah, State of Oregon, have invented certain new and useful Improvements in Undercut-Saw Guides, of which the following is a description, reference being had to the accompanying drawings, forming a part hereof.

My invention relates to an improved device for supporting and guiding drag saws in an inverted position as used in undercutting fallen trees or logs.

The object of the invention is to provide a construction in which the parts may be so arranged that the saw may be used on any one of the four sides of the supporting shank, as will be of great benefit in the event that the saw would have to be operated other than across the log in which the support is driven.

Another object is to provide a device that is capable of reversal in such a manner as to apply pressure on the saw in a downward direction, or in the event that the supporting shank was inverted, pressure would be applied in the usual manner.

A further object of the invention is to provide a mechanism in which the supporting and guiding spool is of such a width that the saw will be supported in its proper position thereon when the log begins to spring, thereby obviating the necessity of changing the position of the support laterally, otherwise the operator would be compelled to work at a gradually changing angle with the saw assuming a gradually increasing angle from the vertical.

A further object in view is to provide a support of a very cheap construction in which the parts may be economically and quickly replaced, the only machine work necessary being on a small part of the device and one should it become injured could be cheaply replaced without the discarding of an expensive part.

With other objects in view, the invention consists in the novel construction and arrangement of parts, as is hereinafter described, fully illustrated in the accompanying drawings and particularly pointed out in the claims hereto appended.

In the drawings, Figure 1 is a side view of my device. Fig. 2 is an elevation of the device taken at right angles to Fig. 1, and Fig. 3 is a view with the parts in position as applied to a log showing the log in section.

Like numerals of reference designate corresponding parts throughout all the figures of the drawings.

In the drawings, 1 designates the elongated shank provided near its upper end with a prong or spike 2 formed integral therewith and adapted to be driven into a log to support the device in position. An extension 3 forming the upper extreme end of the shank 1 is adapted to assist in maintaining the shank in its position after the prong 2 is driven to place.

The shank 1 is square in cross section throughout its entire length with the exception of a portion of its extreme lower end which is rounded, as shown at 4, said rounded portion having no greater diameter than the cross section of the square portion. A split pin 5 is inserted through a perforation in the lower extreme end of the shank and is adapted to prevent the removal of the adjustable saw pressing member when in its lowest position.

The saw supporting spool 6 provided with grooves 7 is carried in a frame 8, said frame being, as shown, constructed of strap iron of the proper thickness bent in such a manner to form a U-shaped portion 9 in which the spool is mounted and a rectangular portion 10 with its end secured at 11 to the U-shaped portion, said rectangular portion being provided in its upper and lower surfaces with square openings 12 of a size to snugly fit over the squared portion of the shank 1. In the side of the rectangular portion of the frame is a perforation indicated by 13 through which a clamping screw 14 passes. Said clamping screw is threaded into a mounting member 14ª, said mounting member being secured to the vertical side of the rectangular frame by rivets 15 and has a screw-threaded aperture 16 in which is mounted the clamping screw 14. At the inner end of the clamping screw, a friction block 17 is provided for contact with the face of the shank 1, said friction block extending from the upper to the lower member of the rectangular portion of the frame and rests throughout its entire length against the shank.

Mounted for vertical movement within the frame 8 is a U-shaped frame 18 provided with perforations 19 in which the trunnions 20 of the saw supporting spool are mounted, said trunnions extending beyond the frame 18 and passing through the elongated slots 21 formed in the side members of the U-shaped portion of the frame.

Mounted in the member 18 beneath the supporting spool is a shank 22 extending through a perforation 23 in the frame and through which it is adapted to freely move. A spring 24 encircling the shank 22 bears at its upper end against the frame 18 and at its lower end against the frame 8 and tends to force the frame 18 and spool carried therein to its upper position with the trunnions 20 in contact with the upper extremity of the slot 21.

By reference to the drawings, it will be noted that the spool 6 is of sufficient width to accommodate a series of grooves running in parallel lines around its periphery and provides rests for the rear edge of the saw 25 in any one of several positions.

The device may be applied for use by driving the prong 2 into the side of a log in such a position as to place the saw supporting spool directly beneath the point at which the kerf in the log is to be made. Should it be found necessary to work the saw on the side of the shank opposite to that in which the parts are shown in the drawings, it will be necessary only to loosen the clamping screw 14 and drop the parts down to the circular part of the shank and swing them around to the position opposite that shown. Again, should there be a condition under which the shank 1 could not be driven into a log in a position in which the sawing was to be done in either of the above named positions and it was found necessary to saw a kerf at right angles to those mentioned, the frame may be swung into a position of 90° from that at which it is shown in the drawings in either direction and the parts will operate perfectly in this position.

Again, should there be for any reason a condition under which pressure was to be applied in a downward direction by removing the split pin, the spool carrying frame may be entirely removed from the shank and reversed, and as it sometimes happens, it will be found expedient to reverse the shank or insert it in the log with the prong 2 down and the shank extending above. In this position with the spool frame reversed on the shank, an upward pressure on the saw may be had the same as when the parts were in their normal position.

Having thus described my invention, what I claim as new and desire to secure by Letters Patent is:—

1. An undercut saw guide comprising an angular shank having an attaching member at one end and a reduced portion at the opposite end, a frame having parallel members slidably mounted upon said shank and a connecting member parallel therewith, clamping means carried by said connecting member, a rectangular frame carried by said sliding frame and having slotted side walls parallel with said shank, a saw supporting and guiding spool slidably mounted within said side walls and having its journal extending through the slots therein, a carrier for said spool, a shank projecting from said carrier through the connecting wall at one end of the side walls, and a spring surrounding said last mentioned shank and disposed between the carrier and said connecting wall.

2. A saw guide comprising a shank formed with an attaching member, a rectangular frame having slotted side walls disposed parallel to said shank, means for adjusting and securing said frame upon said shank, a U-shaped carrier slidingly mounted within the walls of said frame, a saw supporting and guiding spool journaled in said carrier and having the ends of its journal disposed in the slots of said side walls, a shank extending from said carrier through the connecting wall at one end of said side walls, and a spring surrounding said last mentioned shank and disposed between the carrier and said connecting wall.

This specification signed and witnessed this 5th day of April A. D. 1915.

JOHN R. BRADY.

In the presence of—
M. THAYER,
ALBERT STREIFF.

Copies of this patent may be obtained for five cents each, by addressing the "Commissioner of Patents, Washington, D. C."